United States Patent [19]

Yasuno

[11] Patent Number: 5,581,871
[45] Date of Patent: Dec. 10, 1996

[54] PROCESS FOR PRODUCING PULSE GENERATOR

[75] Inventor: Kazushi Yasuno, Saitama, Japan

[73] Assignee: Toyo Denso Kabushiki Kaisha, Tokyo, Japan

[21] Appl. No.: 233,784

[22] Filed: Apr. 26, 1994

[30] Foreign Application Priority Data

Apr. 27, 1993 [JP] Japan ................................. 5-100751

[51] Int. Cl.$^6$ ........................................................ H01F 41/00
[52] U.S. Cl. ................. 29/606; 264/272.15; 264/272.19
[58] Field of Search ................................... 29/458, 527.3, 29/527.4, 606; 264/271.1, 272.11, 272.15, 272.19, 275

[56] References Cited

U.S. PATENT DOCUMENTS

| | | |
|---|---|---|
| 3,328,614 | 6/1967 | Falge et al. . |
| 4,442,822 | 4/1984 | Kondo et al. . |
| 4,721,864 | 1/1988 | Goossens . |
| 4,796,354 | 1/1989 | Yokoyama et al. ............ 264/272.11 X |
| 4,849,728 | 7/1989 | Goll et al. . |
| 5,226,221 | 7/1993 | Kilgore ........................ 264/272.19 X |
| 5,331,730 | 7/1994 | Brinn, Jr. ................................. 29/606 |

FOREIGN PATENT DOCUMENTS

| | | |
|---|---|---|
| 63-16304 | 5/1988 | Japan . |
| 2-28580 | 2/1990 | Japan . |
| 2-18689 | 5/1990 | Japan . |
| 2-27908 | 6/1990 | Japan . |
| 5-302933 | 11/1993 | Japan . |

*Primary Examiner*—S. Thomas Hughes
*Attorney, Agent, or Firm*—Armstrong, Westerman, Hattori, McLeland & Naughton

[57] ABSTRACT

A process for producing a pulse generator which includes a stay, a coil assembly, a core surrounded by the coil assembly, and a magnet clamped between a base end of the core and the stay, all of which are coupled to one another by a synthetic resin. In a producing process, the insert assembly including the core connected at its base end to the stay through the magnet is inserted into a resin mold having a reference receiving portion into which the substantially entire core is fitted and which receives at least one of the tip and base ends of the core. A molten synthetic resin is poured into the resin mold to form a case of the synthetic resin, which includes a positioning projection on an outer surface thereof at a location spaced at a constant distance from at least one of the tip and base ends of the core. Then, in a condition in which the coil assembly has been inserted into an accommodating recess provided in the case, the synthetic resin is filled into between an inner surface of the accommodating recess and the coil assembly. Thus, a gap between the tip end of the core and a pulse rotor is always constant, and the inclination of a core and the breakage of a coil are prevented.

10 Claims, 3 Drawing Sheets

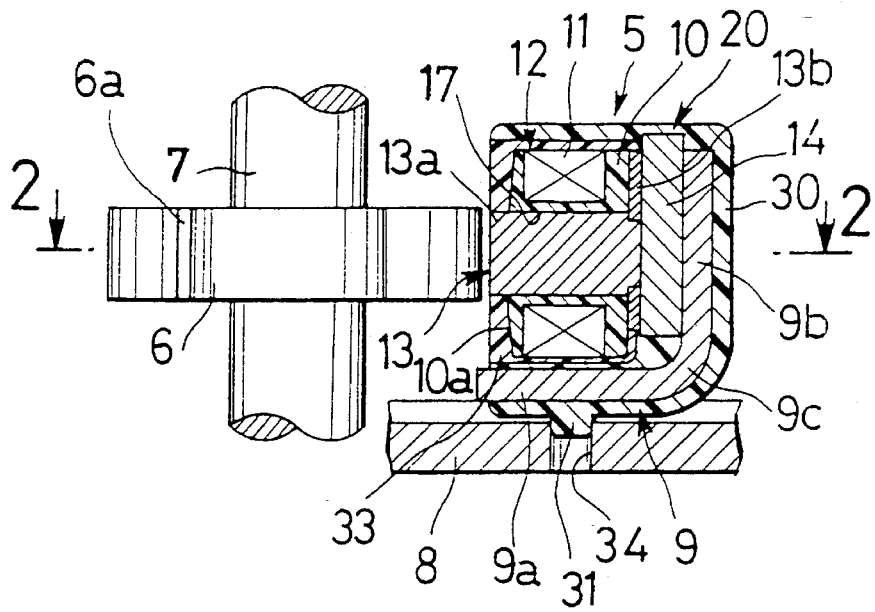
FIG. 1
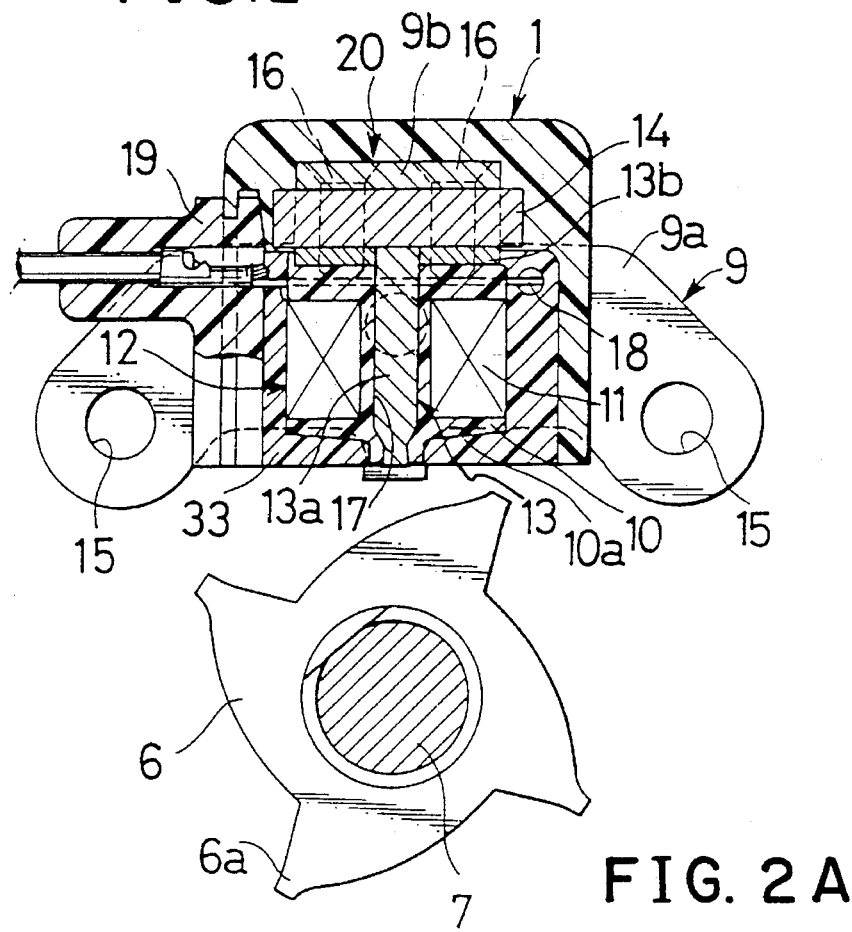
FIG. 2
FIG. 2A

PROCESS FOR PRODUCING PULSE GENERATOR

BACKGROUND OF THE INVENTION

1. Field of the Invention

The present invention relates to an improvement in a process for producing a pulse generator which includes a stay of a substantially L-shaped section having a support plate portion secured to a stationary support and a mounting plate portion connected to the support plate portion, a cylindrical coil assembly including a coil wound around a bobbin, a core extending parallel to the support plate portion and surrounded by the coil assembly, a magnet clamped between a base end of the core and the mounting plate portion wherein, the stay, cylindrical coil assembly, core and magnet are coupled together by a synthetic resin in such a manner that a portion of the support plate portion projects, and that the tip end of the core is exposed to the outside.

2. Description of the Prior Art

Such pulse generators have been conventionally known, for example, from Japanese Utility Model Publication No.16304/88 and Japanese Patent Publication No.27908/90.

The stay of the pulse generator is mounted to the stationary support, so as to provide a given gap between the tip end of the core and a rotatable pulse rotor opposed to the tip end of the core. In order to maintain such gap constant, it is necessary to maintain at a constant distance the space between the fastened portion of the stay to the stationary support and the tip end of the core. However, it is difficult to maintain such a constant gap, because there are tolerances in size for the stay, the coil assembly and the magnet.

Thereupon, in the prior art pulse generator disclosed in Japanese Utility Model Publication No.16304/88, the synthetic resin is filled between the mounting plate portion of the stay and the magnet, and the tip end of the core is brought into abutment against the reference face of the mold with pushing the tip end by the synthetic resin filled between the mounting plate portion of the stay and the magnet during molding in the resin mold. In the prior art pulse generator disclosed in Japanese Patent Publication No.27908/90, the tip end of the core is brought into abutment against the reference face of the mold by pushing the magnet with a pin provided in the resin mold. With this process, the distance between the mounting plate portion of the stay and the tip end of the core can always be maintained constant. However, there is also a tolerance in size of the stay and hence, the distance between a mounting hole provided in the support plate portion of the stay and the tip end of the core is not necessarily constant. Therefore, when the stay has been mounted to the stationary support, a variation is produced in the gap between the tip end of the core and the pulse rotor. Moreover, in the prior art pulse generators disclosed in both the publications, an embedding process using the synthetic resin is carried out while keeping the core surrounded by the coil assembly and therefore, only the tip end of the core is received by the reference face of the resin mold. As a result, the force for retaining the core within the resin mold is weak; the core may be inclined by the pressure of the synthetic resin filled into the resin mold; and the breakage of the coil may occur.

SUMMARY OF THE INVENTION

Accordingly, it is an object of the present invention to provide a process for producing a pulse generator, wherein the gap between the tip end of the core and the pulse rotor can always be maintained constant in a condition in which the pulse generator has been mounted to the stationary support, and moreover, any breakage of the coil is prevented from occurring.

To achieve the above object, according to a first aspect and feature of the present invention, there is provided a process for producing a pulse generator which comprises a stay of a substantially L-shaped section including a support plate portion secured to a stationary support and a mounting plate portion connected to said support plate portion, a cylindrical coil assembly including a coil wound around a bobbin, a core extending parallel to said support plate portion and surrounded by said coil assembly, a magnet clamped between a base end of said core and said mounting plate portion, wherein said stay, cylindrical coil assembly, core and magnet are coupled together by a case wiring a synthetic resin in such a manner that a portion of said support plate portion projects, to an outside and a tip end of the core is exposed, to the outside said process comprising the steps of: inserting an insert assembly comprised of said core connected at its base end to said mounting plate portion through said magnet, into a resin mold having a reference receiving portion into which substantially the entire core is fitted and which receives at least one of the tip and base ends of the core, pouring a synthetic resin into said resin mold to form the case made of synthetic resin which has a positioning projection to be fitted into said stationary support on an outer surface of the case at a location at a constant distance from at least one of the tip and base ends of said core, and which has an accommodating recess around said core at a location corresponding to said reference receiving portion, and filling the synthetic resin between an inner surface of the accommodating recess and the coil assembly by potting in a condition in which said coil assembly has been inserted into said accommodating recess.

With the above process, the distance between the tip end of the core and the positioning projection on the outer surface of the case can always be maintained constant. Therefore, in securing the pulse generator to the support, the positioning projection can be fitted into the support to set a constant gap between the pulse rotor and the core tip end. The coil assembly is cast in the case after formation of the case, and hence, the breakage of the coil is reliably prevented during molding of the case in the resin mold. Further, since substantially the entire core is fitted to the reference receiving portion, the insert assembly can be firmly retained within the resin mold, and the core cannot be inclined by the pressure of the molten resin filled into the mold.

The resin mold may include a pair of upper and lower dies and a slide die movable on a matched surface of the lower die. The reference receiving portion may be provided in the lower die, and a recess for molding the positioning projection may be defined on the slide die. Thus, the slide die is slidable while keeping constant its vertical position relative to the lower die and therefore, the positioning projection can always be easily formed at a constant distance from the tip end of the core.

Further, if the bobbin has an outer end face formed in a tapered configuration with its diameter gradually increased toward the base end of the core, a flow of the molten resin in between the inner surface of the accommodating recess and the coil assembly is promoted during filling of the synthetic resin by potting, thereby ensuring that the synthetic resin is filled without leaving a space.

In addition, according to a second aspect and feature of the present invention, there is provided a process for producing a pulse generator which comprises a stay of a substantially L-shaped section including a support plate portion secured to a stationary support and a mounting plate portion connected to said support plate portion, a cylindrical coil assembly including a coil wound around a bobbin, a core extending parallel to said support plate portion and surrounded by said coil assembly, a magnet clamped between a base end of said core and said mounting plate portion, wherein said stay, cylindrical coil assembly, core and magnet are coupled together by a case using a synthetic resin in such a manner that a portion of said support plate portion projects, to an outside and a tip end of the core is exposed, to the outside said process comprising the steps of: inserting an insert assembly comprised of said core connected at its base end to said mounting plate portion through said magnet, into a resin mold having a reference receiving portion into which substantially the entire core is fitted, pouring a synthetic resin into said resin mold to form the case made of synthetic resin which has an accommodating recess around said core at a location corresponding to said reference receiving portion, and filling the synthetic resin between an inner surface of said accommodating recess and the coil assembly by potting in a condition in which said coil assembly has been inserted into said accommodating recess.

With the above process, the coil assembly is cast in the case after formation of the case, and hence, any breakage of the coil is reliably prevented during molding of the case in the resin mold. Further, since substantially the entire core is fitted to the reference receiving portion, the insert assembly can be firmly retained within the resin mold, and the core cannot be inclined by the pressure of the molten resin filled into the mold.

Further, according to a third aspect and feature of the present invention, there is provided a process for producing a pulse generator which comprises a stay of a substantially L-shaped section including a support plate portion secured to a stationary support and a mounting plate portion connected to said support plate portion, a cylindrical coil assembly including a coil wound around a bobbin, a core extending parallel to said support plate portion and surrounded by said coil assembly, a magnet clamped between a base end of said core and said mounting plate portion, wherein said stay, cylindrical coil assembly, core and magnet are coupled together by a case using a synthetic resin in such a manner that a portion of said support plate portion projects, to an outside and a tip end of the core is exposed, to the outside said process comprising the steps of: inserting an insert assembly comprised of said core connected at its base end to said mounting plate portion through said magnet, into a lower die of a resin mold having a cylindrical reference receiving portion into which substantially the entire is fitted, placing an upper die of the main mold onto said lower die to define a cavity between said insert assembly and both the dies, pouring a molten synthetic resin into the cavity to form the case in which said insert assembly is coupled, by molding, to define an accommodating recess around said core at a location corresponding to said reference receiving portion, inserting said coil assembly into said accommodating recess, and filling the synthetic resin between an inner surface of said accommodating recess and said coil assembly by potting to cast said coil assembly in said case.

With the above process, the coil assembly is cast in the case after molding of the case, and hence, any breakage of the coil is reliably prevented during molding of the case in the resin mold. Further, since substantially the entire core is fitted to the reference receiving portion, the insert assembly can be firmly retained within the resin mold, and the core cannot be inclined by the pressure of the molten resin filled into the mold.

The above and other objects, features and advantages of the invention will become apparent from the following description of preferred embodiments, taken in conjunction with the accompanying drawings.

BRIEF DESCRIPTION OF THE DRAWINGS

FIG. 1 is a longitudinal sectional view of a pulse generator as mounted to a support;

FIGS. 2 and 2A are an enlarged sectional view taken along a line 2—2 in FIG. 1;

DESCRIPTION OF THE PREFERRED EMBODIMENTS

Figure 3:
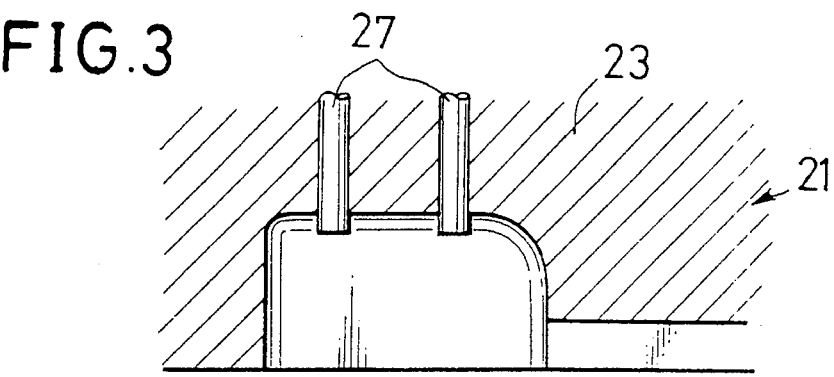
FIGS. 3 and 3A are longitudinal sectional view of a resin mold in its opened state for use in a process according to a first embodiment of the present invention.

The present invention will now be described by way of preferred embodiments in connection with the accompanying drawings.

Referring first to FIGS. 1, 2 and 2A, a pulse generator 5 is used, for example, in an internal combustion engine for a vehicle. A pulse rotor 6 is provided at its outer periphery with a single or a plurality of projections 6A. The pulse generator is mounted to a stationary support 8 whose relative position with respect to the pulse rotor 6 is maintained constant.

The pulse generator 5 includes a stay 9 formed to have a substantially L-shaped longitudinal section, a cylindrical coil assembly 12 with a coil 11 wound around a bobbin 10 made of synthetic resin, a core 13 surrounded by the coil assembly 12, and a magnet 14 clamped between a base end of the core 13 and the stay 9. The stay 9, the cylindrical coil assembly 12, the core 13 and the magnet 14 are coupled to one another by a synthetic resin in such a manner that a portion of the stay 9 projects, and a tip end of the core 13 is exposed to the outside.

The stay 9 includes a support plate portion 9a fastened on the support 8, and a mounting plate portion 9b connected at a substantially right angle to one end of the support plate portion 9a through a curved portion 9c. Opposite sides of the other end of the support plate portion 9a are enlarged and shown in FIG. 2. The other end of the support plate portion 9a is provided at its opposite sides with mounting holes 15, 15 for fastening the support plate portion 9a to the support 8.

The core 13 includes a main core portion 13a having a rectangular cross-section and extending parallel to the support plate portion 9a, and a flange portion 13b caulked to a base end of the main core portion. The magnet 14 is formed into a flat plate-like shape. The base end of the core 13, i.e., the flange portion 13b, is mounted to the mounting plate portion 9b, with the magnet 14 clamped between the flange portion 13b and the mounting plate portion 9b, by a pair of screw members 16, 16 passed through the mounting plate portion 9b and the magnet 14.

An insert hole 17 having a rectangular cross-section is defined in the cylindrical coil assembly 12 over its axially entire length, and the main core portion 13a of the core 13 is inserted through the insert hole 17. The bobbin 10 has an axially outer end face 10a which is tapered such that its diameter is gradually increased axially inwardly.

A pair of lead wires 18, 18 are connected to the coil 11 and drawn to the outside through a grommet 19.

Figure 3A:
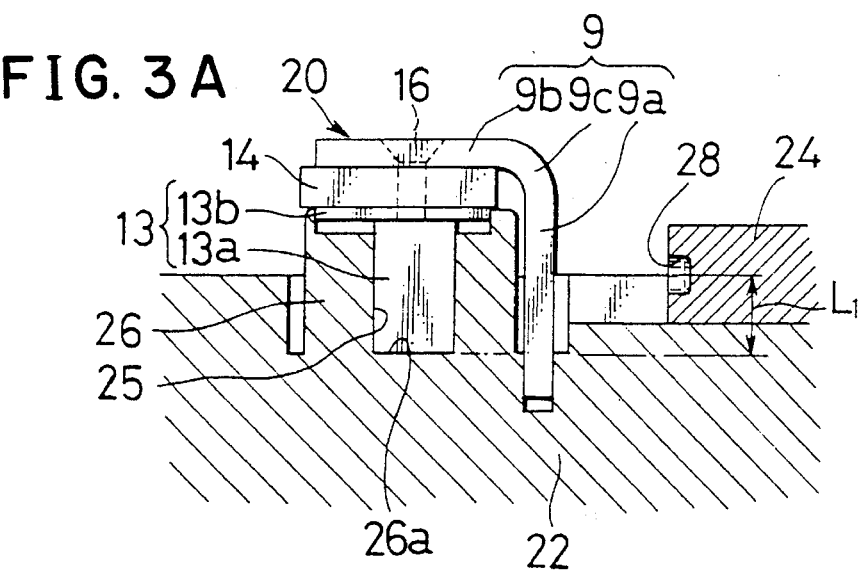

In making such pulse generator 5, there is prepared an insert assembly 20 as shown in FIGS. 3 and 3A. The insert assembly 20 and the grommet 19 having the lead wires 18, 18 are inserted therethrough are inserted into a resin mold 21.

The insert assembly 20 includes the core 13 connected at its base end to the mounting plate portion 9b of the stay 9 through the magnet 14. The resin mold 21 includes a stationary lower die 22, an upper die 23 liftable above the lower die 22, and a slide die 24 slidable between the lower die 22 and the upper die 23.

The lower die 22 is provided with a reference receiving portion 26 having a fitting recess 25 at its central portion. The insert assembly 20 is received by the reference receiving portion 26, such that the substantially entire core 13 is fitted into the fitting recess 25. The recess 25 is provided at its closed end with a reference receiving face 26a against which the tip end of the core 13 abuts when fitted in the fitting recess 25. The depth of the fitting recess 25 is set so that a gap is created between the base end of the core 13, i.e., the flange portion 13b and an upper end of the reference receiving portion 26 in a condition in which the tip end of the core 13 has been brought into abutment against the reference receiving face 26a. An upper surface of the lower die 22 is formed such that a gap is created between the support plate portion 9a of the stay 9 and the lower die 22 in such condition. A pair of urging pins 27, 27 are disposed on the upper die 23 for vertical movement relative to the upper die 23 and adapted to abut against the mounting plate portion 9b of the stay 9 in the insert assembly 20 from an upward position so as to urge the insert assembly 20 against the reference receiving portion 26. Further, a recess 28 is provided on a tip end face of the slide die 24. The distance $L_1$ between the recess 28 and the reference receiving face 26a is constant, because the slide die 24 is slid into position so that its vertical portion is flush with respect to the lower die 22.

Figure 4:
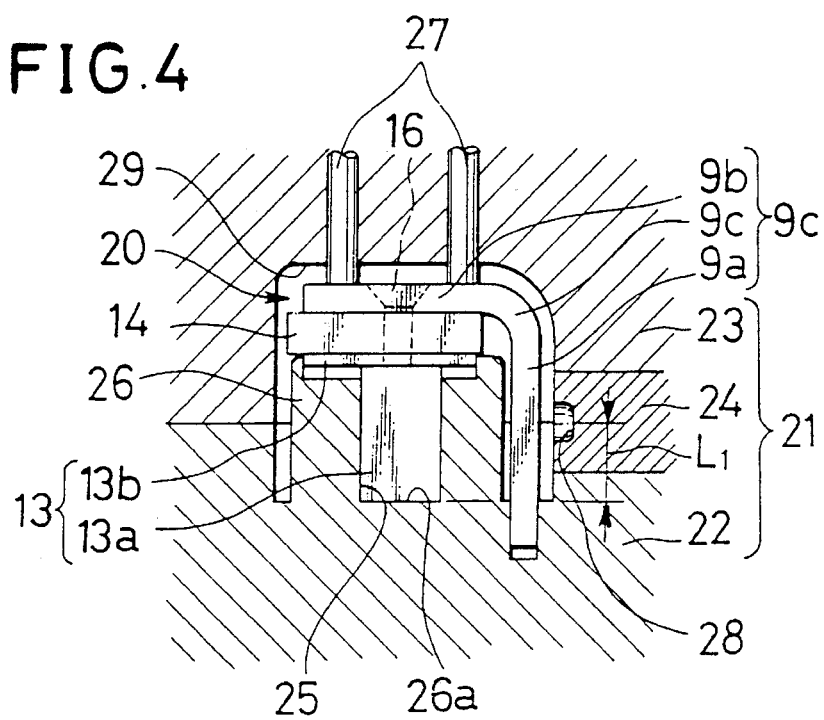
FIG. 4 is a sectional view similar to FIG. 3, but in a closed state.

The insert assembly 20 is inserted into such resin mold 21 which is in an opened state, and the grommet 19 is set. When the resin mold 21 is closed as shown in FIG. 4, a cavity 29 is defined between the insert assembly 20 and the resin mold 21, wherein the recess 28 at the tip end of the slide die 24 faces the cavity 29. In this condition, a molten synthetic resin is filled into the cavity 29 by injection molding or the like.

Figure 5:
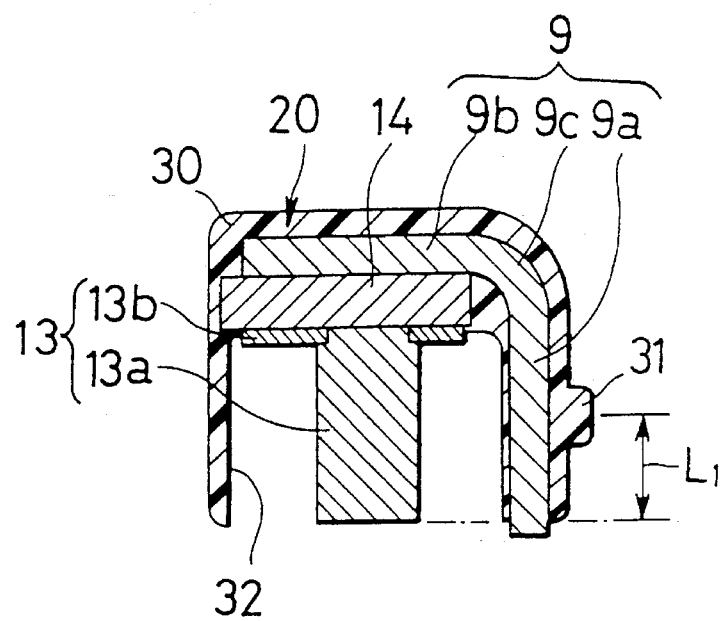
FIG. 5 is a longitudinal sectional view of a product obtained after molding in the resin mold.

After completion of the molding in the resin mold 21, a product as shown in FIG. 5 is obtained. More specifically, the insert assembly 20 and the grommet 19 are coupled, in a molding manner, to each other in a case 30 made of synthetic resin having a shape corresponding to that of the cavity 29, so that portions of the support plate portion 9a of the stay 9 in the insert assembly 20, i.e., portions provided with the mounting holes 15, 15 project oppositely sideways from the case 30. A positioning projection 31 corresponding to the recess 28 is formed on an outer surface of the case 30 at a location spaced apart at a constant distance $L_1$ from the tip end of the core 13, and an accommodating recess 32 corresponding to the reference receiving portion 26 of the lower die 22 is defined around the core 13.

The coil assembly 12 is inserted into the accommodating recess 32. In this condition, a synthetic resin is filled by potting between an inner surface of the accommodating recess 32 and the coil assembly 12. This causes the coil assembly 12 surrounding the core 13 to be fixed to the case 30 by a resin filled portion 33, thereby providing a pulse generator 5. During filling of the synthetic resin, a flow of the molten resin between the inner surface of the accommodating recess 32 and the coil assembly 12 is promoted to ensure that the resin is filled without leaving a space, because the outer end face 10a of the bobbin 10 in the coil assembly 12 is formed into a tapered configuration with its diameter gradually increased axially inwardly.

Referring again to FIG. 1, a fitting hole 34 is provided in the support 8 at a radially predetermined distance from the rotor shaft 7. The pulse generator 5 is fastened to the support 8 with the positioning projection 31 fitted in the fitting hole 34.

The operation of this embodiment will be described below. When the insert assembly 20 is inserted into the resin mold 21 in an opened state, substantially the entire core 13 is fitted into the fitting recess 25, and the tip end of the core 13 is received by reference receiving face 26a at the closed end of the fitting recess 25. The resin mold 21 is closed, and the synthetic resin is filled into the cavity 29, thereby forming the case 30 made of synthetic resin having the positioning projection 31 on the outer surface at the location at the constant distance $L_1$ from the tip end of the core 13. The positioning projection 31 is fitted into the fitting hole 34 when the pulse generator 5 is fastened to the support 8. Therefore, even if there is a tolerance in size for each of the stay 9, the core 13 and the magnet 14, the distance $L_1$ between the positioning projection 31 and the core 13 can always be maintained constant. Thus, in a condition in which the pulse generator 5 has been mounted to the support 8, the gap between the pulse rotor 6 and the core 13 can be set constant.

In molding the case 30 by the resin mold 21, the insert assembly 20 including the core 13 connected at its base end to the mounting plate portion 9b of the stay 9 through the magnet 14 is inserted into the resin mold 21, and the coil assembly 12 inserted in the accommodating recess 32 after molding of the case 30 is fixed to the case 30 by the resin-filled portion 33. Therefore, the breakage of the coil 11, which has been conventionally produced during molding in the resin mold 21, is reliably prevented. Moreover, since substantially the entire core 13 is fitted into the fitting recess 25 of the reference receiving portion 26 upon insertion of the insert assembly 20 into the resin mold 21, the insert assembly 20 can firmly be retained in the resin mold 21, and the core 13 cannot be inclined by a filling pressure of the molten resin.

In the first embodiment, even if there is a tolerance in size for the core 13, the distance $L_1$ between the tip end of the core 13 and the positioning projection 31 can be set constant. However, when the lengthwise dimension of the core 13 can accurately be obtained, the case 30 may be formed in such a manner as in a second embodiment shown in FIG. 6.

Figure 6:
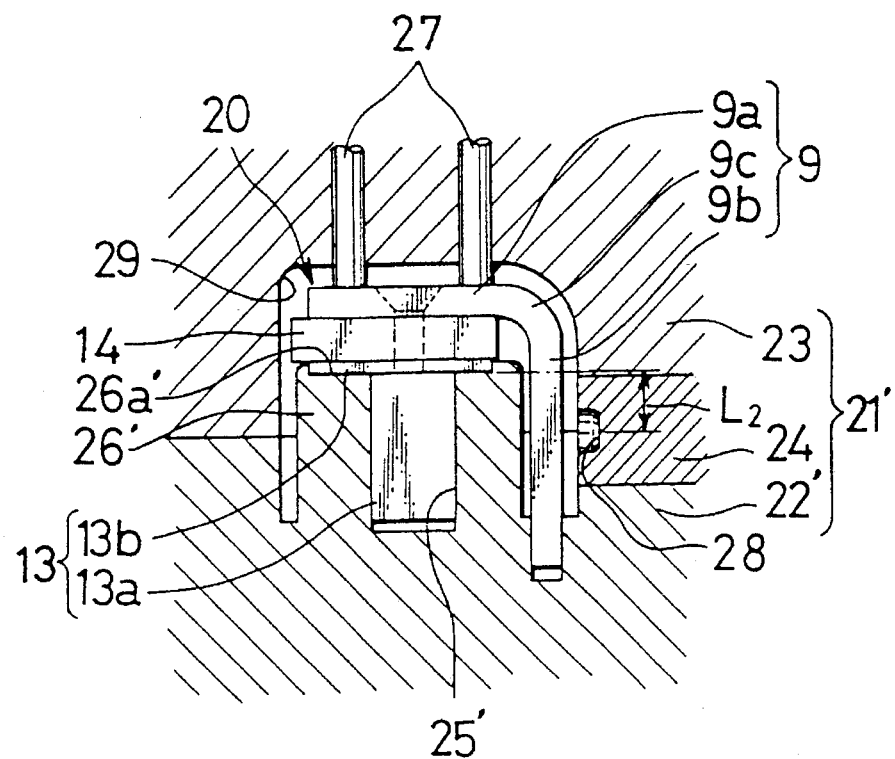
FIG. 6 is a sectional view similar to FIG. 4, but according to a second embodiment of the present invention.

Referring to FIG. 6, a lower die 22' of a resin mold 21' is provided with a reference receiving portion 26' having a fitting recess 25' at its central portion. An insert assembly 20 is received by the reference receiving portion 26' in such a manner that the substantially entire core 13 is fitted into the fitting recess 25'. A reference receiving face 26a' is formed at an upper end of the reference receiving portion 26', and a base end of the core 13 fitted in the fitting recess 25', i.e., a flange portion 13b, is brought into abutment against the reference receiving face 26a'. The depth of the fitting recess 25' is set such that a gap is produced between the tip end of the core 13 and a closed end of the fitting recess 25' in a condition in which the base end of the core 13 has been put into abutment against the reference receiving face 26a'. An upper surface of the lower die 22' is formed into a shape such that a gap is produced between the support plate portion of the stay 9 and the lower die 22'.

With such construction, the distance L2 between the recess 28 provided on the tip end face of the slide die 24 and the reference receiving face 26a' is constant, and the lengthwise dimension of the core 13 is set accurately. Thus, the distance between the positioning projection 31 (see FIG. 5) corresponding to the recess 28 and the tip end of the core 13 is determined at a constant value, and even if there is a tolerance in size for each of the stay 9 and the magnet 14, the gap between the pulse rotor 6 and the tip end of the core 13 can be set constant in a condition in which the pulse generator 5 has been mounted to the support 8, as in the first embodiment.

Although the embodiments of the present invention have been described in detail, it will be understood that the present invention is not limited to these embodiments, and various modifications in design may be made without departing from the spirit and scope of the invention defined in claims.

For example, as the core 13, the main core portion 13a and the flange portion 13b may be integrally formed.

What is claimed is:

1. A process for producing a pulse generator which comprises a stay of a substantially L-shaped section including a support plate portion secured to a stationary support and a mounting plate portion connected to said support plate portion, a cylindrical coil assembly including a coil wound around a bobbin, a core extending parallel to said support plate portion and surrounded by said coil assembly, a magnet clamped between a base end of said core and said mounting plate portion, wherein said stay, said cylindrical coil assembly, said core and said magnet are coupled together by a synthetic resin case in such a manner that a portion of said support plate portion projects outside of said synthetic resin case, and a tip end of the core remains exposed outside of said synthetic resin case, said process comprising the steps of:

inserting an insert assembly, comprising of said core connected at its base end to said mounting plate portion through said magnet, into a resin mold having a reference receiving portion into which substantially the entire core is fitted and which receives at least one of the tip and base ends of the core;

pouring a synthetic resin under pressure into said resin mold to form said synthetic resin case which has a positioning projection to be fitted into said stationary support on an outer surface of said synthetic resin case at a location at a constant distance from at least one of the tip and base ends of said core, and which has an accommodating recess for said coil assembly around said core at a location corresponding to said reference receiving portion;

removing said synthetic resin case from said resin mold;

inserting said coil assembly into said accommodating recess of said synthetic resin case; and filling synthetic resin between an inner surface of said accommodating recess and the coil assembly by potting.

2. A process for producing a pulse generator according to claim 1, wherein said resin mold comprises upper and lower dies and a slide die movable on a matched surface of the lower die; said reference receiving portion is provided in said lower die, and said slide die is formed with a recess for molding said positioning projection.

3. A process for producing a pulse generator according to claim 1, wherein said bobbin has an outer end face formed in a tapered configuration with its diameter gradually increased toward the base end of said core.

4. A process for producing a pulse generator which comprises a stay of a substantially L-shaped section including a support plate portion secured to a stationary support and a mounting plate portion connected to said support plate portion, a cylindrical coil assembly including a coil wound around a bobbin, a core extending parallel to said support plate portion and surrounded by said coil assembly, a magnet clamped between a base end of said core and said mounting plate portion, wherein said stay, said cylindrical coil assembly, said core and said magnet are coupled together by a synthetic resin case in such a manner that a portion of said support plate portion projects outside of said synthetic resin case and a tip end of the core remains exposed outside of said synthetic resin case, said process comprising the steps of:

inserting an insert assembly, comprised of said core connected at its base end to said mounting plate portion through said magnet, into a resin mold having a reference receiving portion into which substantially the entire core is fitted;

pouring a synthetic resin under pressure into said resin mold to form said synthetic resin case which has an accommodating recess for said coil assembly around said core at a location corresponding to said reference receiving portion;

removing said synthetic resin case from said resin mold;, inserting said coil assembly into said accommodating recess of said synthetic resin case; and filling the synthetic resin between an inner surface of said accommodating recess and the coil assembly by potting.

5. A process for producing a pulse generator according to claim 4, wherein said synthetic resin case is provided with a positioning projection to be fitted in said stationary support at an outer surface of said synthetic resin case at a location at a constant distance from at least one of the tip and base ends of said core.

6. A process for producing a pulse generator according to claim 4, wherein said reference receiving portion includes a reference receiving face formed on a lower die of said resin mold for receiving at least one of the tip and base ends of the core, and said positioning projection is formed by a slide die which is slidable on an opened surface of said lower die.

7. A process for producing a pulse generator which comprises a stay of a substantially L-shaped section including a support plate portion secured to a stationary support and a mounting plate portion connected to said support plate portion, a cylindrical coil assembly including a coil wound around a bobbin, a core extending parallel to said support plate portion and surrounded by said coil assembly, a magnet clamped between a base end of said core and said mounting plate portion, wherein said stay, said cylindrical coil assembly, said core and said magnet are coupled together by a synthetic resin coil in such a manner that a portion of said support plate portion projects outside of said synthetic resin case, and a tip end of the core remains exposed outside of said synthetic resin case, said process comprising the steps of:

inserting an insert assembly, comprised of said core connected at its base end to said mounting plate portion through said magnet, into a lower die of a resin mold having a cylindrical reference receiving portion into which substantially the entire core is fitted;

placing an upper die of the resin mold onto said lower die to define a cavity between said insert assembly and both the dies;

pouring a molten synthetic resin under pressure into the cavity to form said synthetic resin case in which said insert assembly is coupled, by molding, to define an accommodating recess for said coil assembly around said core at a location corresponding to said reference receiving portion;

removing said synthetic resin case from said resin mold;

inserting said coil assembly into said accommodating recess; and filling the synthetic resin between an inner surface of said accommodating recess and said coil assembly by potting to cast said coil assembly in said synthetic resin case.

8. A process for producing a pulse generator according to claim 7, wherein said reference receiving portion is provided with a reference receiving face against which the tip end of the core fitted in said reference receiving portion is brought into abutment; a gap is produced between the base end of said core and an upper end of said reference receiving portion in a condition in which the tip end of said core has been brought into abutment against said reference receiving face; and said resin mold further includes a slide die slidably provided between said upper and lower dies, said slide die having a recess defined therein for the positioning projection and leading to said cavity.

9. A process for producing a pulse generator according to claim 7, wherein said reference receiving portion is provided with a reference receiving face against which the base end of the core fitted in said reference receiving portion is brought into abutment; a gap is produced between the tip end of said core and a lower end of said reference receiving portion in a condition in which the base end of said core has been brought into abutment against said reference receiving face; and said resin mold further includes a slide die slidably provided between said upper and lower dies, said slide die having a recess defined therein for the positioning projection and leading to said cavity.

10. A process for producing a pulse generator according to claim 7, wherein said bobbin has an outer end face formed in a tapered configuration with its diameter gradually increased toward the base end of the core.

* * * * *